Patented Jan. 9, 1951

2,537,022

UNITED STATES PATENT OFFICE 2,537,022

INSECT REPELLENTS

Paul D. Bartlett, Weston, Mass., and Abraham Schneider, Philadelphia, Pa., assignors to the United States of America as represented by the Secretary of the Army No Drawing. Application January 7, 1949, Serial No. 69,835

5 Claims. (Cl. 167—22)

This invention relates to insect repellents.

We have found that the application of an aldehyde of the general formula

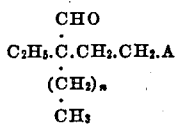

wherein A is selected from the cyano and the carboxyl group, and $n$ is an integer between 1 and 3, to the human skin or to a fabric affords effective protection against insect bites by repelling inserts, parti:ularly *Aedes aegypti* and *Anopheles quadrimaculatus*.

A number of tests to measure the repellency of these compounds against *Aedes aegypti* and *Anopheles quadrimaculatus* was conducted by smearing the compound on the arms of test personnel, who then thrust their arms into cages containing *Aedes aegypti*. The arms were exposed for 30-minute intervals at 3 minutes each until the first insect bite.

Tests to measure the repellency against *Aedes aegypti* of fabrics impregnated with these compounds were conducted by uniformly impregnating mercerized cotton hose with the compound at a rate equivalent to 3.3 gms. per sq. ft., drawing the dried hose over the arms of test personnel, who then thrust their covered arms into cages containing *Aedes aegypti* for 1 to 2 minutes. If no bites or less than 5 bites were received, the tests were repeated each successive day until 5 or more bites during one exposure were received.

Examples of aldehydes whose 2-(beta-cyanoethyl) or 2-(beta-carboxyethyl) substitution products possess insect repellent properties are the thus substituted 2-ethyl butyraldehyde, 2-ethyl valeraldehyde or 2-ethyl hexaldehyde.

The following table illustrates the insect repellency conferred by three typical compounds contemplated by our invention:

|  | Repellency on Application to Skin | | Repellency of Impregnated Fabric Against *Aedes aegypti* |
| --- | --- | --- | --- |
|  | *Aedes aegypti* | *Anopheles quadrimaculatus* |  |
| 2-ethyl-2-(beta-cyano-ethyl)-butyraldehyde. | 302 min. | 76 min. | over 10 days. |
| 2-ethyl-2-(beta-cyano-ethyl)-hexaldehyde. | 266 min. | 55 min. |  |
| 2-ethyl-2-(beta-carboxy-ethyl)-hexaldehyde. | 309 min. | 49 min. | over 10 days. |

For ease of application to the skin, the compounds may be incorporated in a suitable inert liquid or solid carrier such as mineral oil, alcohol, petrolatum, etc. For ease and uniformity of application to the fabric, the compounds may be applied to the fabric in an inert solvent, such as alcohol, ether, etc.

Having thus described our invention, we claim:

1. An insect repellent composition comprising in an inert organic solvent an aldehyde being a member of the group consisting of 2-ethyl-2-(beta-cyanoethyl) - butyraldehyde, 2 - ethyl-2-(beta-cyanoethyl) - valeraldehyde, 2 - ethyl- 2 -(beta-cyanoethyl)-hexaldehyde, and 2-ethyl-2-(beta-carboxyethyl)-hexaldehyde.

2. An insect repellent composition comprising an aldehyde of the general formula

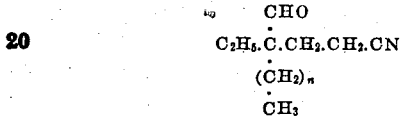

wherein $n$ is an integer from 1 to 3, and a non-gaseous inert organic carrier.

3. An insect repellent composition comprising 2-ethyl-2-(beta-cyanoethyl) - butyraldehyde in an inert organic solvent.

4. An insect repellent composition comprising 2-ethyl-2-(beta-cyanoethyl)-hexaldehyde in an inert organic solvent.

5. An insect repellent composition comprising 2-ethyl-2-(beta-carboxy-ethyl)-hexaldehyde in an inert organic solvent.

PAUL D. BARTLETT.
ABRAHAM SCHNEIDER.

REFERENCES CITED

The following references are of record in the file of this patent:

OSRD, Insect Control Committee Report No. 28, Interim Report No. 0-94, May 18, 1945; particularly page 47, Orlando No. 0-5927, 2-(beta-carboxyethyl)-2-ethylbutyraldehyde.